United States Patent
Chen et al.

(10) Patent No.: US 12,554,340 B2
(45) Date of Patent: Feb. 17, 2026

(54) TERMINAL VIEWPOINT BASED VIRTUAL REALITY INTERACTION METHOD, AND DEVICE AND STORAGE MEDIUM

(71) Applicant: Beijing Zitiao Network Technology Co., Ltd., Beijing (CN)

(72) Inventors: Xu Chen, Beijing (CN); Zhenghao Guan, Beijing (CN); Bei Wang, Beijing (CN); Minhui Xie, Beijing (CN); Xiaoting Liang, Beijing (CN); Wei Peng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/730,672

(22) PCT Filed: Jan. 17, 2023

(86) PCT No.: PCT/CN2023/072538
§ 371 (c)(1),
(2) Date: Jul. 19, 2024

(87) PCT Pub. No.: WO2023/138559
PCT Pub. Date: Jul. 27, 2023

(65) Prior Publication Data
US 2025/0103148 A1  Mar. 27, 2025

(30) Foreign Application Priority Data
Jan. 21, 2022 (CN) .......................... 202210074599.8

(51) Int. Cl.
*G06F 3/0346* (2013.01)
(52) U.S. Cl.
CPC .............................. *G06F 3/0346* (2013.01)

(58) Field of Classification Search
CPC .. G06F 3/0346; G06F 3/011; G06F 2203/012; G06T 19/006
See application file for complete search history.

(56) References Cited

U.S. PATENT DOCUMENTS

| 2009/0256837 A1 | 10/2009 | Deb et al. |
| 2014/0267386 A1 | 9/2014 | Bolz et al. |
| (Continued) | | |

FOREIGN PATENT DOCUMENTS

| CN | 105955456 A | 9/2016 |
| CN | 108337497 A | 7/2018 |
| (Continued) | | |

OTHER PUBLICATIONS

Liu, M. "Research and Implementation of Key Technologies in Real time 3D Roaming System," Chinese Excellent Master's Thesis Full Text Database, Information Technology Collection, Issue 04, Apr. 15, 2010, 50 pages. Submitted with English abstract.
(Continued)

*Primary Examiner* — David D Davis
(74) *Attorney, Agent, or Firm* — Alleman Hall LLP

(57) ABSTRACT

A virtual reality interaction method and apparatus, a device and a storage medium are provided. The method includes: displaying, on a terminal, a real-time captured real-world scene image; wherein the real-world scene image includes a virtual model; extending a scene edge of the virtual model towards a screen edge of the terminal; switching a scene image displayed on the terminal from the real-world scene to a virtual scene in response to detecting that a viewpoint of the terminal crosses a plane where the scene edge of the virtual model located,; and obtaining an interactive instruction for the virtual scene and displaying an interactive effect corresponding to the interactive instruction.

20 Claims, 4 Drawing Sheets

(56) References Cited

U.S. PATENT DOCUMENTS

| | | |
|---|---|---|
| 2019/0385371 A1 | 12/2019 | Joyce et al. |
| 2020/0160610 A1* | 5/2020 | Wei .................. G06T 19/006 |
| 2020/0380769 A1* | 12/2020 | Liu .................... G06V 40/20 |
| 2021/0035346 A1* | 2/2021 | Chen .................. G06T 13/20 |
| 2021/0200421 A1* | 7/2021 | Delfino .......... G06F 3/04815 |

FOREIGN PATENT DOCUMENTS

| | | |
|---|---|---|
| CN | 108805989 A | 11/2018 |
| CN | 109993823 A | 7/2019 |
| CN | 110163976 A | 8/2019 |
| CN | 110275617 A | 9/2019 |
| CN | 111324253 A | 6/2020 |
| CN | 112148189 A | 12/2020 |
| CN | 112215966 A | 1/2021 |
| CN | 112767531 A | 5/2021 |
| CN | 112933606 A | 6/2021 |
| CN | 114461064 A | 5/2022 |
| CN | 114461064 B | 9/2023 |
| RU | 2733161 C1 | 9/2020 |

OTHER PUBLICATIONS

Tang, Y. et al., "Deferred Shading Framework for Simulation Drilling System," Available online at http://www.c-s-a.cn, Sep. 15, 2016, 12 pages.

China National Intellectual Property Administration, Notice of Allowance Issued in Application No. 202210074599.8, Aug. 22, 2023, 7 pages.

China National Intellectual Property Administration, Office Action and Search Report Issued in Application No. 202210074599.8, Jul. 10, 2023, 17 pages.

ISA China National Intellectual Property Administration, International Search Report and Written Opinion Issued in Application No. PCT/CN2023/072538, Apr. 4, 2023, 3 pages.

* cited by examiner

TERMINAL VIEWPOINT BASED VIRTUAL REALITY INTERACTION METHOD, AND DEVICE AND STORAGE MEDIUM

CROSS-REFERENCE TO RELATED APPLICATION

The present disclosure is the national phase application of International Patent Application No. PCT/CN2023/072538, filed on Jan. 17, 2023, which claims the priority of China Patent Application No.202210074599.8 filed in China Patent Office on Jan. 21, 2022, and the entire contents of the above application are incorporated into this disclosure by reference.

TECHNICAL FIELD

The present disclosure relates to the technical field of Internet applications, such as a method and for virtual reality interaction, an apparatus, a device, and a storage medium.

BACKGROUND

With the continuous development of Internet technologies, a variety of interesting special effect applications have emerged on the Internet, allowing users to select corresponding special effect applications for video shooting. However, the form of special effect applications in related technologies is relatively simple, and the interactivity is poor, which cannot meet the personalized interaction needs of users.

SUMMARY

The embodiment of the present disclosure provides a method, an apparatus, a device and a storage medium for virtual reality interaction, so as to enrich the display effect of virtual reality interaction.

In a first aspect, an embodiment of the present disclosure provides a virtual reality interaction method, comprising:
  displaying, on a terminal, a real-time captured real-world scene imager; wherein the real-world scene image includes a virtual model;
  controlling a scene image displayed on the terminal to switch from the real-world scene to a virtual scene in response to detecting that a viewpoint of the terminal crosses a plane where a scene edge of the virtual model located, during the process that the scene edge of the virtual model extends towards the terminal; and
  obtaining an interactive instruction for the virtual scene and displaying an interactive effect corresponding to the interactive instruction on the terminal.

In a second aspect, an embodiment of the present disclosure provides a virtual reality interaction apparatus, comprising:
  a first display module configured to display, on a terminal, a real-time captured real-world scene image; wherein the real-world scene image includes a virtual model;
  a first control module configured to control a scene image displayed on the terminal to switch from the real-world scene to a virtual scene in response to detecting that a viewpoint of the terminal crosses a plane where the scene edge of the virtual model located, during the process that a scene edge of the virtual model extends towards the terminal; and
  a second display module configured to obtain an interactive instruction for the virtual scene and display an interactive effect corresponding to the interactive instruction on the terminal.

In a third aspect, an embodiment of the present disclosure provides an electronic device, comprising a memory and a processor, wherein the memory stores a computer program, wherein the computer program, when executed by the processor, cause the processor to implement the virtual reality interaction method provided in the first aspect of the embodiment of the present disclosure.

In a fourth aspect, the embodiment of the present disclosure provides a computer readable storage medium, on which a computer program is stored, wherein the computer program, when executed by a processor, causes the processor to implement the virtual reality interaction method provided in the first aspect of the embodiment of the present disclosure.

BRIEF DESCRIPTION OF THE DRAWINGS

Throughout the drawings, the same or similar reference numerals indicate the same or similar elements. It should be understood that the drawings are schematic, and the originals and elements are not necessarily drawn to scale.

DETAILED DESCRIPTION

Figure 1:
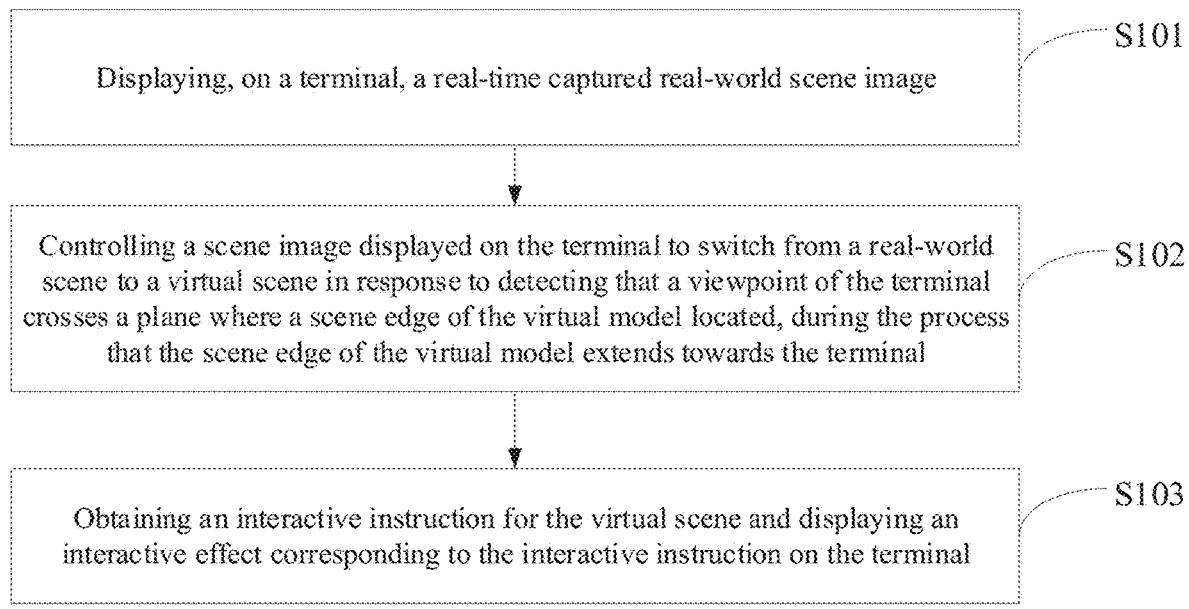
FIG. 1 is a flowchart of a virtual reality interaction method provided in an embodiment of the present disclosure.

Embodiments of the present disclosure will be described below with reference to the accompanying drawings. Although embodiments of the present disclosure are displayed in the drawings, it should be understood that the present disclosure can be embodied in various forms and should not be construed as limited to the embodiments set forth herein. It should be understood that the drawings and embodiments of the present disclosure are for exemplary purposes only.

It should be understood that the steps described in the method embodiments of the present disclosure may be performed in a different order and/or in parallel. Furthermore, method embodiments may include additional steps and/or omit performing the illustrated steps.

As used herein, the term "comprising" and its variants are open-ended including, that is, "comprising but not limited to". The term "based on" is "at least partially based on". The term "one embodiment" means "at least one embodiment"; The term "another embodiment" means "at least one other embodiment"; the term "some embodiments" means "at least some embodiments". Related definitions of other terms will be given in the following description.

It should be noted that the concepts of "first" and "second" mentioned in this disclosure are only used to distinguish different devices, modules or units, and are not used to limit the order or interdependence of the functions performed by these devices, modules or units.

It should be noted that the modifications of "a" and "a plurality" mentioned in this disclosure are schematic, and those skilled in the art should understand that unless the context clearly indicates otherwise, they should be understood as "one or more".

Names of messages or information exchanged among multiple devices in the embodiment of the present disclosure are only used for illustrative purposes, which are not used to limit the scope of these messages or information.

FIG. 1 is a flowchart of a virtual reality interaction method provided in an embodiment of the present disclosure. The present embodiment may be applied to an electronic device and is applicable to a virtual reality interaction scene. The electronic device may be at least one of devices such as a smart phone, a smart watch, a desktop computer, a laptop computer, a virtual reality terminal, an augmented reality terminal, a wireless terminal, and a laptop portable computer. The following description is made by taking a terminal for example. As displayed in FIG. 1, the method may comprise the following steps.

At S101, displaying, on a terminal, a real-time captured real-world scene image.

The real-world scene image refers to an image captured by a camera of a terminal in real time, and the image includes a virtual model therein. The virtual model may be a model formed by a closed curve to distinguish between the real-world scene image and a virtual scene image. For example, the style of the virtual model may be an image scroll or a closed curve in any shape, such as a square, a circle, or an ellipse, etc. Optionally, the virtual scene image may be displayed inside a scene edge of the virtual model (i.e., within the closed curve), and the real-world scene image may be displayed outside the scene edge of the virtual model (i.e., beyond the closed curve).

The scene edge of the virtual model may continuously extend towards the terminal. In this process, the terminal detects whether it crosses a plane where the scene edge of the virtual model located in real time and performs a corresponding control operation based on a detection result.

At S102, controlling a scene image displayed on the terminal to switch from a real-world scene to a virtual scene in response to detecting that a viewpoint of the terminal crosses a plane where a scene edge of the virtual model located, during the process that the scene edge of the virtual model extends towards the terminal.

In the process of the scene edge of the virtual model extending towards the terminal, the terminal detects whether it crosses the plane where the scene edge of the virtual model located in real time, and if it is detected that the viewpoint of the terminal crosses the plane where the scene edge of the virtual model located, the current scene image displayed on the terminal is controlled to switch from the real-world scene to the virtual scene, i.e., a current display interface of the terminal displays an image in the virtual scene. Here, the viewpoint of the terminal crosses the plane where the scene edge of the virtual model located. The viewpoint may also be referred to as a virtual camera for drawing the virtual scene. If it is not detected that the viewpoint of the terminal crosses the plane where the scene edge of the virtual model located, the terminal is kept in a state of staying in the real-world scene, i.e., the current view angle of the terminal is still at the real-world scene and the current display interface still displays an image in the real-world scene.

As an optional implementation, the above process of detecting that the viewpoint of the terminal crosses the plane where the scene edge of the virtual model located may be extending the scene edge of the virtual model to completely cover the display image. That is, the scene edge of the virtual model continuously extends towards the terminal. When the scene edge extends to completely cover the current display image, it may be considered that the viewpoint of the terminal crosses the plane where the scene edge of the virtual model located. Otherwise, it is determined that the terminal does not cross the plane where the scene edge of the virtual model located.

As an optional implementation, the above process of detecting that the viewpoint of the terminal crosses the plane where the scene edge of the virtual model located may include the following steps:

At step a, determining a first result of whether the viewpoint of the terminal crosses the plane where the scene edge of the virtual model located, based on world coordinate positions of the scene edge of the virtual model in a previous frame and a current frame and a world coordinate position of the terminal in the current frame.

Illustratively, a position of the viewpoint (i.e., the virtual camera) of the terminal may be abstracted as a vertex and the scene edge of the virtual model as a plane in advance. Four vertexes are set on the scene edge of the virtual model, and the plane may be localized by obtaining positions of any three vertexes of the four vertexes extending along with the scene edge of the virtual model. The world coordinate position of the scene edge of the virtual model in the previous frame may be construed as the world coordinate position of the scene edge at a time point of the previous frame. Similarly, the world coordinate position of the scene edge of the virtual model in the current frame may be construed as the world coordinate position of the scene edge at a time point of the current frame, and the position of the virtual camera of the terminal in the current frame may be construed as the world coordinate position of the virtual camera at the time point of the current frame.

On this basis, a first target point is determined from the world coordinate position of the scene edge of the virtual model in the previous frame, namely an average value of world coordinate positions of four vertexes on the scene edge of the virtual model in the previous frame, and a second target point is determined from the world coordinate position of the scene edge of the virtual model in the current frame, namely an average value of the world coordinate positions of the four vertexes on the scene edge of the virtual model in the current frame. Next, a first vector is determined based on the world coordinate position of the virtual camera of the terminal in the current frame and the world coordinate position of the first target point, and a second vector is determined based on the world coordinate position of the virtual camera of the terminal in the current frame and the world coordinate position of the second target point. A normal vector of the plane where the scene edge of the virtual model located is determined; and a dot product of the first vector and the normal vector is calculated to obtain a first dot product result, and a dot product of the second vector and the normal vector is calculated to obtain a second dot product result. If the first dot product result and the second dot product result have contrary signs (here, the contrary signs refer to that the first dot product result is positive and the second dot product result is negative, or the first dot product result is negative and the second dot product result is positive), it is determined that the virtual camera of the terminal has an intersection point with the plane formed by the four vertexes on the scene edge of the virtual model in the process of the scene edge of the virtual model extending towards the terminal. Moreover, in case of an intersection point existing, whether the intersection point falls in a same direction with a quadrangle formed by connecting the four vertexes is judged; if yes, it indicates that the intersection point falls within the quadrangle, indicating that the first result is the viewpoint of the terminal crossing the plane where the scene edge of the virtual model located; otherwise, if no, it indicates that the intersection point is not within the quadrangle, indicating that the first result is the viewpoint of the terminal not crossing the plane where the scene edge of the virtual model located. As a matter of course, if the virtual camera of the terminal has no intersection point with the plane formed by the four vertexes on the scene edge of the virtual model, it indicates that the first result is the viewpoint of the terminal not crossing the plane where the scene edge of the virtual model located.

In an embodiment, a plane normal of the plane formed by the four vertexes may also be determined, and a direction of a moving vector of the virtual camera of the terminal is compared with the plane normal to find out in which direction the viewpoint of the terminal crosses the plane where the scene edge of the virtual model located (i.e., from inside to outside or from outside to inside).

At step b, determining a second result of whether the viewpoint of the terminal crosses the plane where the scene edge of the virtual model located based on world coordinate positions of the terminal in the previous frame and the current frame and a world coordinate position of the scene edge of the virtual model in the current frame.

The moving vector of the virtual camera is obtained based on world coordinate positions of the virtual camera of the terminal in the previous frame and the current frame, and whether a straight line of the moving vector of the virtual camera has an intersection point with the plane formed by the four vertexes on the scene edge of the virtual model and whether the intersection point falls in the same direction with the quadrangle formed by connecting the four vertexes are determined based on the world coordinate position of the scene edge of the virtual model in the current frame. When the two conditions are satisfied simultaneously, it may be determined that the second result is the viewpoint of the terminal crossing the plane where the scene edge of the virtual model located. When at least one of the two conditions are not satisfied, it may be determined that the second result is that the viewpoint of the terminal does not cross the plane where the scene edge of the virtual model located. A process of determining whether the straight line of the moving vector of the virtual camera has an intersection point with the plane formed by the four vertexes on the scene edge of the virtual model may be as follows: assuming that the straight line of the moving vector of the virtual camera is AB and the intersection point of the straight line AB with the plane formed by the four vertexes is C, judging whether C is inside AB, and if yes, indicating that there is an intersection point, and if no, indicating that there is no intersection point.

It needs to be noted that the world coordinate positions of the scene edge of the virtual model in the previous frame and the current frame, the world coordinate position of the terminal in the current frame, the world coordinate positions of the terminal in the previous frame and the current frame, and the world coordinate position of the scene edge of the virtual model in the current frame may be determined based on a simultaneous localization and mapping (SLAM) algorithm.

At step c, determining a target result of whether the viewpoint of the terminal crosses the plane where the scene edge of the virtual model located based on at least one of the first result and the second result.

After the first result and the second result are obtained, the target result of whether the viewpoint of the terminal crosses the plane where the scene edge of the virtual model located may be determined by taking the first result and the second result into overall consideration. In other words, the target result of whether the viewpoint of the terminal crosses the plane where the scene edge of the virtual model located may be determined based on the first result, or the target result of whether the viewpoint of the terminal crosses the plane where the scene edge of the virtual model located may be determined based on the second result. Also, the target result of whether the viewpoint of the terminal crosses the plane where the scene edge of the virtual model located may be determined based on the first result and the second result. Optionally, a label is set as 0 for not crossing, −1 for forward crossing, and 1 for reverse crossing. In the event that the first result is not 0, the first result may be determined as the target result of whether the viewpoint of the terminal crosses the plane where the scene edge of the virtual model located. In the event that the first result is 0, the second result may be determined as the target result of whether the viewpoint of the terminal crosses the plane where the scene edge of the virtual model located.

At S103, obtaining an interactive instruction for the virtual scene and displaying an interactive effect corresponding to the interactive instruction on the terminal.

Figure 2:
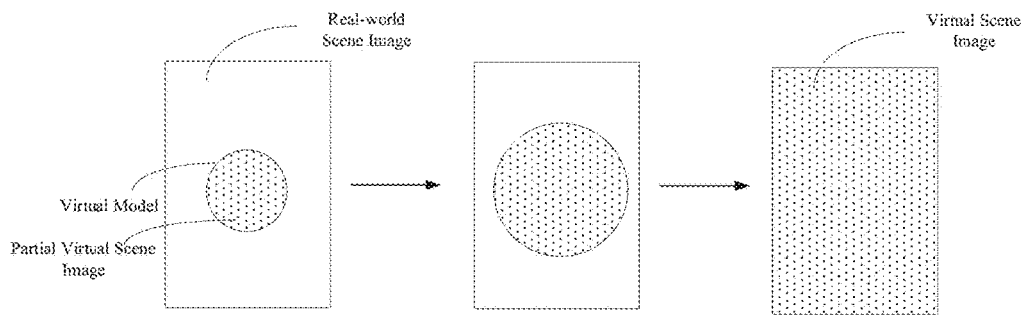
FIG. 2 is a schematic diagram of a virtual reality interaction effect provided in an embodiment of the present disclosure.

After the view angle of the terminal is switched to the virtual scene, the virtual scene supports the interactive function. A user may trigger a corresponding triggering operation. After obtaining an interactive instruction from the user for the virtual scene, the terminal may show a corresponding interactive effect based on the interactive instruction, thus allowing the user to perceive the change of the virtual scene and enhancing the interactivity with virtual information. Exemplarily, as displayed in FIG. 2, the current interface of the terminal displays the real-world scene image that includes the virtual model therein. The scene edge of the virtual model extends towards the terminal, and a partial virtual scene image is displayed inside the scene edge of the virtual model. The partial virtual scene image is obtained by performing screen UV sampling on a panoramic image in the virtual scene on the basis of the scene edge of the virtual model. With the scene edge of the virtual model continuously extending towards the terminal, the viewpoint of the terminal continuously zooms in towards the virtual scene, and upon detecting that the viewpoint of the terminal crosses the plane where the scene edge of the virtual model located, the scene image displayed on the terminal is switched from the real-world scene to the virtual scene, i.e., the current display interface of the terminal displays the virtual scene image. After entering the virtual scene, the terminal may detect the interactive instruction from the user and display the corresponding interactive effect based on the interactive instruction.

Optionally, if it is detected that the viewpoint of the terminal crosses the plane where the scene edge of the virtual model located again, the display image is controlled to switch from the virtual scene to the real-world scene.

In practical use, to exit the virtual scene, the terminal may move a preset distance in a direction away from the virtual scene, and in this process, whether the viewpoint of the terminal crosses the plane where the scene edge of the virtual model located is detected in real time. If it is detected that the viewpoint of the terminal crosses the plane where the scene edge of the virtual model located again, the scene image displayed on the terminal may be switched from the virtual scene to the real-world scene. That is, before switching, the display interface of the terminal displays the virtual scene image, and after switching, the display interface of the terminal displays an image in the real-world scene.

According to the virtual reality interaction method provided in the embodiment of the present disclosure, a real-time captured real-world scene image is displayed on a terminal, where the real-world scene image includes a virtual model therein; a scene edge of the virtual model extends towards a terminal, and if it is detected that a viewpoint of the terminal crosses a plane where the scene edge of the virtual model located, the terminal is controlled to switch from a real-world scene to a virtual scene; and an interactive instruction for the virtual scene is obtained and an interactive effect corresponding to the interactive instruction is displayed on the terminal. Thus, a service of adding the virtual model to the real-world scene image, switching the current scene image displayed on the terminal from the real-world scene to the virtual scene upon detecting that the viewpoint of the terminal crosses the plane where the scene edge of the virtual model located, and enabling interaction with a user in the virtual scene can be realized. The above solution enriches the displaying effects of virtual reality interaction, enhances the interactivity in a virtual reality interaction process, and meets the personalized displaying requirement of a user for virtual information.

Figure 3:
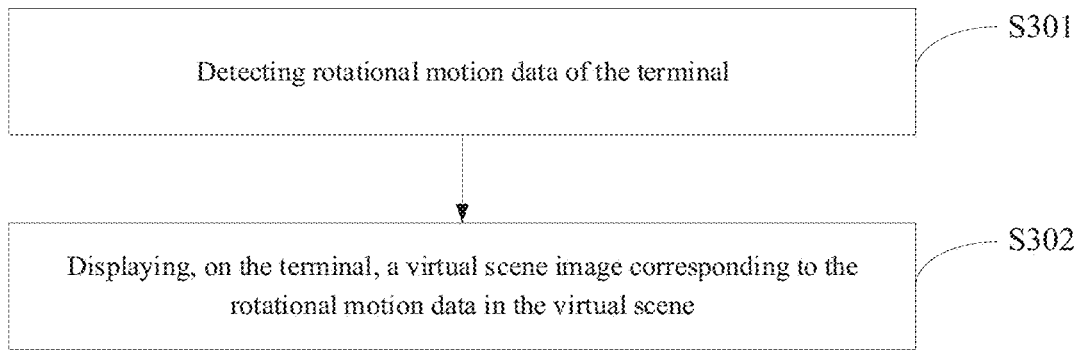
FIG. 3 is a flowchart of an interactive process in a virtual scene provided in an embodiment of the present disclosure.

After the view angle of the terminal enters the virtual scene, the user can browse the virtual scene 360 degrees. On the basis of the above embodiment, optionally, as displayed in FIG. 3, S103 may include the following steps.

At S301, detecting rotational motion data of the terminal.

The rotational motion data may include a rotation direction and a rotation angle. A corresponding sensor, such as a gyroscope, is provided in the terminal, and the rotational motion data of the terminal may be detected by the sensor.

At S302, displaying, on the terminal, a virtual scene image corresponding to the rotational motion data in the virtual scene.

After detecting that the terminal rotates, i.e., the view angle of the terminal changes in the virtual scene, at this time, the virtual scene image corresponding to the rotational motion data in the virtual scene may be rendered based on the obtained rotational motion data, and the virtual scene image is displayed on the terminal. Thus, with the rotation of the terminal, the user may browse the virtual scene 360 degrees.

Optionally, the virtual scene image may include a dynamic object and a static object therein. Among them, the static object refers to an object of which the state does not change with image, e.g., an object such as a green mountain, a house, and a cloud, etc. The dynamic object refers to an object of which the state may change with image, e.g., an object such as a carp and fireworks, etc.

Optionally, the object in the virtual scene image may be a three-dimensional object. On this basis, based on the above embodiment, optionally, S302 may include the following steps.

At S3021, determining a first target object corresponding to the rotational motion data in the virtual scene.

After detecting that the terminal rotates, i.e., the view angle of the terminal changes in the virtual scene, at this time, the first target object corresponding to the rotational motion data in the virtual scene may be determined based on the obtained rotational motion data.

At S3022, obtaining depth information of the first target object.

The depth information refers to a distance between a plane where a camera of the terminal located and the surface of the first target object.

At S3023, rendering the first target object based on the depth information and displaying a rendering result on the terminal.

After obtaining the depth information of the first target object, the terminal may render the first target object based on a depth value of the first target object and display the rendering result so that the displayed rendering result can reflect a spatial three-dimensional effect.

It should be noted that the number of the first target object may be one or more.

Optionally, the virtual scene image may also include interactive guidance information therein, e.g., a dynamic guiding small hand. From the interactive guidance information, an object available for interaction in the virtual scene may be clearly known, i.e., which objects are available for interaction and which objects are unavailable for interaction can be known. For example, the object available for interaction in the virtual scene image may be a lantern, and the dynamic guiding small hand is set at the corresponding position of the lantern to indicate that the lantern supports the interactive function. Thus, the user may tap on the screen position where the lantern is located to illuminate the lantern, realizing interaction with the virtual scene.

On this basis, based on the above embodiment, optionally, the process of S103 may also be as follows: displaying, on the terminal, a first interactive effect in response to a triggering operation for a first second target object in the virtual scene; and synchronously displaying the first interactive effect and a second interactive effect in response to a triggering operation for an N-th second target object in the virtual scene, wherein the first interactive effect is different from the second interactive effect, and N is a natural number greater than 1.

The first interactive effect is different from the second interactive effect, and N is a natural number of greater than 1. The second target object supports an interactive operation of the user, and the user may perform the triggering operation on the second target object. After obtaining the triggering operation for the second target object in the virtual scene, the terminal shows the corresponding first interactive effect. The first interactive effect may be implemented by a corresponding mapping technique or animation technique. Stilling taking the second target object as the lantern for example, before interaction, the lantern is dark and the virtual scene image is also dark. The user performs the triggering operation on the lantern based on the dynamic guiding hand in the virtual scene image. After the triggering operation on the lantern is obtained, the terminal controls the lantern to brighten from dark and present a greeting, and the virtual scene image also brightens from dark. For example, the mapping technique may be employed to achieve the effect that the lantern brightens from dark and the virtual scene image brightens from dark. Meanwhile, a corresponding animation is played to achieve the effect that a greeting couplet is suspended from the lantern.

In practical use, the virtual scene image may include a plurality of second target objects therein. The user may orderly perform the triggering operation on the plurality of second target objects to display the corresponding first interactive effects. To enrich the images of the virtual scene, optionally, upon obtaining the triggering operation for the N-th second target object in the virtual scene, the terminal may synchronously display the first interactive effect and a second interactive effect. The first interactive effect is different from the second interactive effect, and the second interactive effect may also be implemented by a corresponding mapping technique or animation technique.

Stilling taking the second target object as the lantern for example, it is assumed that 4 lanterns are included in the virtual scene. The user may illuminate each lantern. Upon detecting the triggering operation on the 4th lantern, the terminal controls the 4th lantern to brighten from dark and a greeting couplet to be suspended from the lantern, and the effect of "Fu" rain may also be presented synchronously. For example, an animation of "Fu" rain may be made in advance and played after the triggering operation on the 4th lantern is detected. As a matter of course, tapping on the 4th lantern to synchronously display the first interactive effect and the second interactive effect as described above is merely an example. A corresponding setting may be made based on a requirement.

In consideration of the object in the virtual scene being a three-dimensional object, after a position on a screen of the terminal is touched, a process of judging whether the touch position interacts with the three-dimensional object may include: obtaining a screen touch position, a first position of the terminal in a three-dimensional space, and a second position of the second target object in the three-dimensional space; converting the screen touch position to a third position in the three-dimensional space, determining a ray corresponding to a touch point based on the third position (here, the touch point may be converted into a corresponding ray based on preset two depth values and the third position), and normalizing the ray to obtain a unit vector of the ray; next, determining a distance of the terminal to the second target object based on the first position and the second position, and multiplying the unit vector by the distance to obtain a target vector; obtaining coordinates of a point of arrival of the target vector with camera coordinates of the terminal, determining whether the point of arrival is within the space where the second target object is located based on the coordinates of the point of arrival and coordinates of a circle center of the second target object, and if yes, the touch point on the screen interacts with the second target object is determined, and if no, the touch point on the screen does not interact with the second target object is determined.

In the above way of judgment, accurate judgment on interaction of the screen touch point with the three-dimensional object in the virtual scene is realized; the accuracy of a localization result is improved, and then the accuracy of the virtual reality interaction is improved.

In the present embodiment, the virtual scene image corresponding to the rotational motion data may be displayed based on the rotational motion data of the terminal so that the virtual scene can be browsed 360 degrees and the change of the virtual scene can be perceived. The interaction manners are enriched and the personalized displaying requirement of the user for the virtual scene is met. Moreover, interaction with an object in the virtual scene image may also be enabled, thereby displaying a more real interactive effect. The virtual scene image displaying effects are enriched; the interestingness of the virtual reality interaction is enhanced; and the user experience is satisfied.

Figure 4:
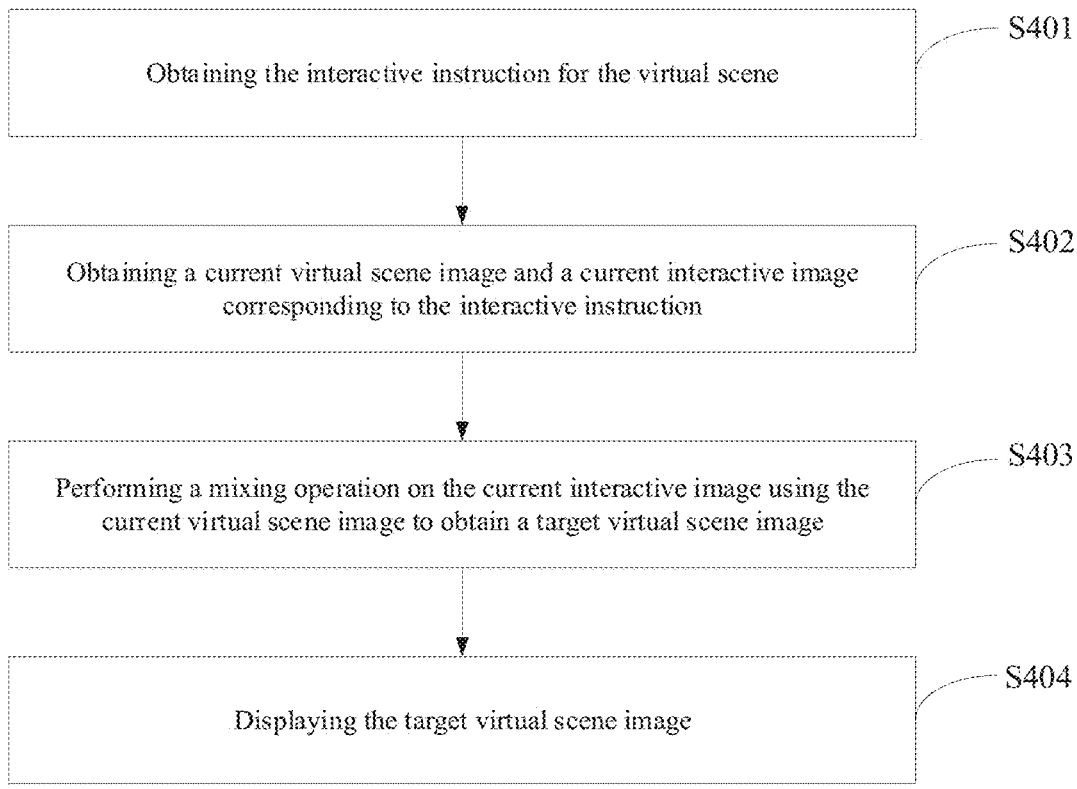
FIG. 4 is another flowchart of an interactive process in a virtual scene provided in an embodiment of the present disclosure.

In an embodiment, to improve the displaying effect of a virtual image, e.g., to better fuse the "Fu" rain appearing in the virtual image into the virtual scene image, a transparent "Fu" effect is presented. Based on the above embodiment, optionally, as displayed in FIG. 4, the process of S103 may further include the following steps.

At S401, obtaining the interactive instruction for the virtual scene.

At S402, obtaining a current virtual scene image and a current interactive image corresponding to the interactive instruction.

The current virtual scene image is a mixed image, and the current interactive image is an image to be mixed. The current interactive image is a current image of interactive sequence frames. For example, the interactive sequence frames are "Fu" rain sequence frames.

At S403, performing a mixing operation on the current interactive image using the current virtual scene image to obtain a target virtual scene image.

Usually, in the mixing operation, the current virtual scene image is used as a mixed image, and the current interactive image is an image to be mixed. However, in the present embodiment, the mixed image and the image to be mixed are set in an opposite relationship. That is, the current virtual scene image is used as the image to be mixed and the current interactive image is used as the mixed image, and the mixing operation is performed on the current interactive image using the current virtual scene image. The mixing operation process may refer to a mixing algorithm in the related technique.

At S404, displaying the target virtual scene image.

In the present embodiment, in the mixing operation of a plurality of layers of images, the current virtual scene image and the current interactive image are set in the opposite relationship such that the finally displayed target virtual scene image is more realistic, and the virtual image displaying effects are enriched. For example, after all the lanterns are illuminated, the "Fu" rain appearing in the virtual scene can be better fused into the virtual scene image, presenting the transparent "Fu" effect.

Figure 5:
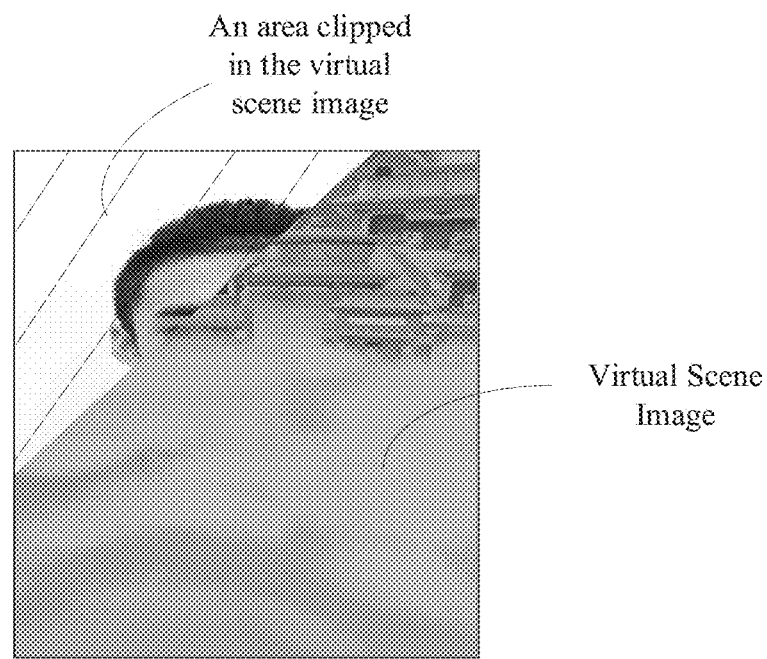
FIG. 5 is a schematic diagram of an image clipped by a near clipping plane of a terminal provided in an embodiment of the present disclosure.

In practical use, due to a limited field of view of the camera of the terminal, the camera will clip an object extending beyond a visual cone, wherein the visual cone is a region shape that can be observed and rendered by a perspective camera. Any object closer to the camera than the near clipping plane may not be rendered. Then, in the process of the viewpoint of the terminal crossing the plane where the scene edge of the virtual model located, as displayed in FIG. 5, i.e., in the process of the terminal switching from the real-world scene to the virtual scene, there may be a problem that part of the virtual scene image is not rendered due to clipping by the near clipping plane of the camera; or in the process of the terminal switching from the virtual scene to the real-world scene, there may also be the problem that part of the real-world scene image is not rendered due to clipping by the near clipping plane of the camera. To this end, processing may be carried out with reference to the following embodiment. Based on the above embodiment, optionally, the method may further include: when a distance between the viewpoint of the terminal and the plane where the scene edge of the virtual model located satisfies a preset threshold, performing a complementing operation on a current display image to pad an image that have been clipped by a near clipping plane of the terminal.

The preset threshold may be determined based on a distance between a plane in which the viewpoint of the terminal lies and a near clipping plane of the visual cone of the camera. In this way, when the distance between the viewpoint of the terminal and the plane where the scene edge of the virtual model located is less than or equal to the preset threshold, there may be the problem of clipping by the near clipping plane of the camera. At this time, the terminal may perform the complementing operation on the current display image in the screen to pad the image clipped by the near clipping plane of the terminal. Thus, the virtual scene image is displayed in the screen of the terminal in the process of the terminal switching from the real-world scene to the virtual scene, avoiding the problem that part of the virtual scene image is not rendered. Meanwhile, the real-world scene image is displayed in the screen of the terminal in the process of the terminal switching from the virtual scene to the real-world scene, avoiding the problem that part of the real-world scene image is not rendered.

As an optional implementation, the process of performing the complementing operation on the current display image may include: determining a target padding image based on a relative positional relationship between the viewpoint of the terminal and the plane where the scene edge of the virtual model located; and performing the complementing operation on the current display image using the target padding image.

The relative positional relationship is capable of reflecting a direction in which the viewpoint of the terminal crosses the plane where the scene edge of the virtual model located. When the viewpoint of the terminal forwardly crosses the plane where the scene edge of the virtual model located, i.e., in the process of the terminal switching from the real-world scene to the virtual scene, four vertexes moving along with the scene edge of the virtual model are set on the virtual model, and screen uv sampling is performed on the virtual scene image by a quadrangle formed by the four vertexes, and a sampling result is determined as the target padding image. Next, the complementing operation is performed on the current display image using the target padding image. For example, the target padding image may be used as a layer and set at the bottom of the current display image to realize complementing of the virtual scene image clipped by the near clipping plane of the camera of the terminal.

When the viewpoint of the terminal reversely crosses the plane where the scene edge of the virtual model located, i.e., in the process of the terminal switching from the virtual scene to the real-world scene, four vertexes moving along with the scene edge of the virtual model are set on the virtual model, and screen uv sampling is performed on the real-world scene image by a quadrangle formed by the four vertexes, and a sampling result is determined as the target padding image. Next, the complementing operation is performed on the current display image using the target padding image. For example, the target padding image may be used as a layer and set at the bottom of the current display image to realize complementing of the real-world scene image clipped by the near clipping plane of the camera of the terminal.

In the present embodiment, in the process of the viewpoint of the terminal crossing the plane where the scene edge of the virtual model located, the complementing operation may be performed on the image clipped by the near clipping plane of the camera of the terminal such that the display image satisfies expectation. That is, when the terminal switches from the real-world scene to the virtual scene, the virtual scene image is displayed in the screen of the terminal, avoiding that part of the real-world scene image is presented; and when the terminal switches from the virtual scene to the real-world scene, the real-world scene image is displayed in the screen of the terminal, avoiding that part of the virtual scene image is presented. Thus, the finally presented visual effect is more realistic and meets the expectation requirement, and the displaying effect of the virtual reality interaction is enhanced accordingly.

Figure 6:
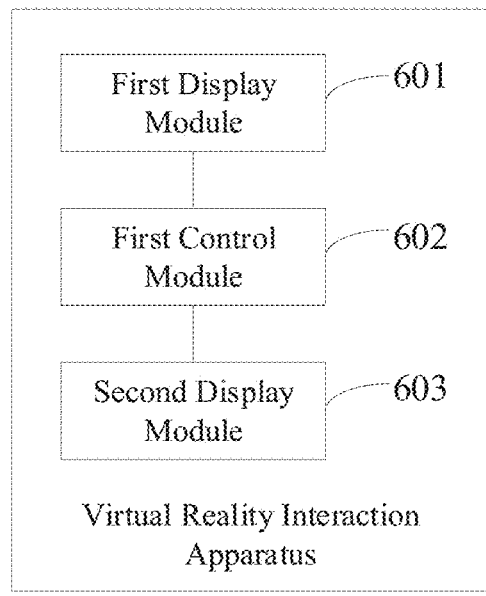
FIG. 6 is a structural schematic diagram of a virtual reality interaction apparatus provided in an embodiment of the present disclosure.

FIG. 6 is a structural schematic diagram of a virtual reality interaction apparatus provided in an embodiment of the present disclosure. As displayed in FIG. 6, the apparatus includes a first display module 601, a first control module 602, and a second display module 603.

For example, the first display module 601 is c configured to display, on a terminal, a real-time captured real-world scene image; wherein the real-world scene image includes a virtual model.

The first control module 602 is configured to control a scene image displayed on the terminal to switch from a real-world scene to a virtual scene when a viewpoint of the terminal crosses a plane where the scene edge of the virtual model located is detected, during the process that a scene edge of the virtual model extends towards the terminal.

The second display module 603 is configured to obtain an interactive instruction for the virtual scene and display an interactive effect corresponding to the interactive instruction on the terminal.

According to the virtual reality interaction apparatus provided in the embodiment of the present disclosure, a real-time captured real-world scene image is displayed on a terminal, where the real-world scene image includes a virtual model therein; a scene edge of the virtual model extends towards a terminal, and if it is detected that a viewpoint of the terminal crosses a plane where the scene edge of the virtual model located, the scene image displayed on the terminal is controlled to switch from a real-world scene to a virtual scene; and an interactive instruction for the virtual scene is obtained and an interactive effect corresponding to the interactive instruction is displayed on the terminal. Thus, a service of adding the virtual model to the real-world scene image, switching the current scene image displayed on the terminal from the real-world scene to the virtual scene upon detecting that the viewpoint of the terminal crosses the plane where the scene edge of the virtual model located, and enabling interaction with a user in the virtual scene can be realized. The above solution enriches the displaying effects of virtual reality interaction, enhances the interactivity in a virtual reality interaction process, and meets the personalized displaying requirement of a user on virtual information.

Based on the above embodiment, optionally, the second display module 603 may include a detection unit and a first display unit.

For example, the detection unit is configured to detect rotational motion data of the terminal.

The first display unit is configured to display a virtual scene image corresponding to the rotational motion data in the virtual scene.

Optionally, the virtual scene image includes interactive guidance information therein.

Based on the above embodiment, optionally, the first display unit is configured to determine to display the virtual scene image corresponding to the rotational motion data by: determine a first target object corresponding to the rotational motion data in the virtual scene; obtain depth information of the first target object; and render the first target object based on the depth information and display a rendering result on the terminal.

Based on the above embodiment, optionally, the second display module 603 may further include a second display unit and a third display unit.

For example, the second display unit is configured to display a first interactive effect in response to a triggering operation for a second target object in the virtual scene.

The third display unit is configured to synchronously display the first interactive effect and a second interactive effect in response to the triggering operation for the N-th second target object in the virtual scene; wherein the first interactive effect is different from the second interactive effect, and N is a natural number greater than 1.

Based on the above embodiment, optionally, the second display module 603 may further include a first obtaining unit, a second obtaining unit, a processing unit, and a fourth display unit.

For example, the first obtaining unit is configured to obtain the interactive instruction for the virtual scene.

The second obtaining unit is configured to obtain a current virtual scene image and a current interactive image corresponding to the interactive instruction, wherein the current virtual scene image is a mixed image, and the current interactive image is an image to be mixed.

The processing unit is configured to perform a mixing operation on the current interactive image using the current virtual scene image to obtain a target virtual scene image.

The fourth display unit is configured to display the target virtual scene image.

Based on the above embodiment, optionally, the apparatus may further include a second control module.

For example, the second control module is configured to control the display image to switch from the virtual scene to the real-world scene when the viewpoint of the terminal crosses the plane where the scene edge of the virtual model located again is detected.

Based on the above embodiment, optionally, the apparatus may further include an image complementing module.

For example, the image complementing module is configured to, when a distance between the viewpoint of the terminal and the plane where the scene edge of the virtual model located satisfies a preset threshold, perform a complementing operation on a current display image to pad an image clipped by a near clipping plane of the terminal.

Based on the above embodiment, optionally, the image complementing module is configured to complement the current display screen by: determine a target padding image based on a relative positional relationship between the viewpoint of the terminal and the plane where the scene edge of the virtual model located; and perform the complementing operation on the current display image using the target padding image.

Based on the above embodiment, optionally, the apparatus may further include a detection module.

For example, the detection module is configured to detect that the viewpoint of the terminal crosses the plane where the scene edge of the virtual model located.

In an embodiment, the detection module is configured to detect the plane where the scene edge of the virtual model located by: determine a first result of whether the viewpoint of the terminal crosses the plane where the scene edge of the virtual model located based on world coordinate positions of the scene edge of the virtual model in a previous frame and a current frame and a world coordinate position of the terminal in the current frame; determine a second result of whether the viewpoint of the terminal crosses the plane where the scene edge of the virtual model located based on world coordinate positions of the terminal in the previous frame and the current frame and a world coordinate position of the scene edge of the virtual model in the current frame; and determine a target result of whether the viewpoint of the terminal crosses the plane where the scene edge of the virtual model located based on at least one of the first result and the second result.

Optionally, the detection module is configured to detect the plane where the scene edge of the virtual model located by: extend the scene edge of the virtual model to completely cover the display image.

Figure 7:
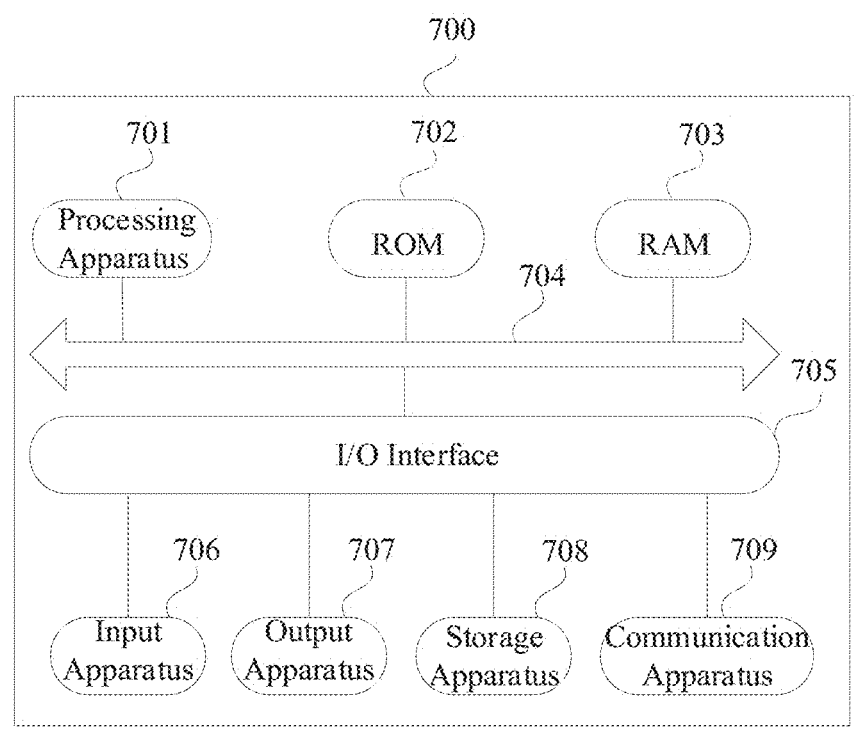
FIG. 7 is a structural schematic diagram of an electronic device provided in an embodiment of the present disclosure.

Referring to FIG. 7, FIG. 7 illustrates a schematic structural diagram of an electronic device 700 suitable for implementing some embodiments of the present disclosure. The electronic devices in some embodiments of the present disclosure may include mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital television (i.e. digital TV), a desktop computer, or the like. The electronic device illustrated in FIG. 7 is merely an example.

As illustrated in FIG. 7, the electronic device 700 may include a processing apparatus 701 (e.g., a central processing unit, a graphics processing unit, etc.), the processing apparatus can perform various suitable actions and processing according to a program stored in a read-only memory (ROM) 702 or a program loaded from a storage apparatus 708 into a random-access memory (RAM) 703. The RAM 703 further stores various programs and data required for operations of the electronic device 700. The processing apparatus 701, the ROM 702, and the RAM 703 are interconnected by means of a bus 704. An input/output (I/O) interface 705 is also connected to the bus 704.

Usually, the following apparatus may be connected to the I/O interface 705: an input apparatus 706 including, for example, a touch screen, a touch pad, a keyboard, a mouse, a camera, a microphone, an accelerometer, a gyroscope, or the like; an output apparatus 707 including, for example, a liquid crystal display (LCD), a loudspeaker, a vibrator, or the like; a storage apparatus 708 including, for example, a magnetic tape, a hard disk, or the like; and a communication apparatus 709. The communication apparatus 709 may allow the electronic device 700 to be in wireless or wired communication with other devices to exchange data. While FIG. 7 illustrates the electronic device 700 having various apparatuses, it should be understood that not all of the illustrated apparatuses are necessarily implemented or included. More or fewer apparatuses may be implemented or included alternatively.

In an embodiment, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 709 and installed, or may be installed from the storage apparatus 708, or may be installed from the ROM 702. When the computer program is executed by the processing apparatus 701, the above-mentioned functions defined in the methods of some embodiments of the present disclosure are performed.

It should be noted that the above-mentioned computer-readable medium in the present disclosure may be a computer-readable signal medium or a computer-readable storage medium or the combination thereof. For example, the computer-readable storage medium may be an electric, magnetic, optical, electromagnetic, infrared, or semiconductor system, apparatus or device, or the combination thereof. Examples of the computer-readable storage medium may include: an electrical connection with at least one wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or the appropriate combination of them. In the present disclosure, the computer-readable storage medium may be tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including an electromagnetic signal, an optical signal, or the appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including an electric wire, a fiber-optic cable, radio frequency (RF) and the like, or the appropriate combination of them.

In an implementation, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as the network currently known or to be researched and developed in the future.

The above-mentioned computer-readable medium may be included in the above-mentioned electronic device, or may also exist alone without being assembled into the electronic device.

The computer readable medium carries at least one programs. The at least one programs, when executed by the electronic device, cause(s) the electronic device to: obtain at least at least two Internet protocol addresses; transmit a node evaluation request including the at least two Internet protocol addresses to a node evaluation device which selects and returns an Internet protocol address from the at least two Internet protocol addresses; receive the Internet protocol address returned by the node evaluation device; and distribute a content indicated by the obtained Internet protocol address to edge nodes in a network.

Alternatively, the computer readable medium carries at least one programs. The at least one programs, when executed by the electronic device, cause(s) the electronic device to: receive a node evaluation request including at least two Internet protocol addresses; select an Internet protocol address from the at least two Internet protocol addresses; return the selected Internet protocol address; and distribute a content indicated by the received Internet protocol address to edge nodes in a network.

The computer program codes for performing the operations of the present disclosure may be written in one or more programming languages or a combination thereof. The above-mentioned programming languages include object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including at least one executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances, for example, the first acquisition unit can also be described as "a unit that acquires at least two Internet protocol addresses".

The functions described herein above may be performed, at least partially, by at least one hardware logic components. For example, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes an electrical, magnetic, optical, electromagnetic, infrared, or semi-conductive system, apparatus or device, or any suitable combination of the foregoing. Examples of machine-readable storage medium include electrical connection with at least one wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or suitable combination of the foregoing.

In an embodiment, there is provided an electronic device, including a memory and a processor, where the memory stores a computer program, wherein the computer program, when executed by the processor, cause the processor to:

display, on a terminal, a real-time captured real-world scene image; wherein the real-world scene image includes a virtual model;

control a scene image displayed on the terminal to switch from a real-world scene to a virtual scene in response to detecting that a viewpoint of the terminal crosses a plane where the scene edge of the virtual model located, during the process that a scene edge of the virtual model extends towards the terminal; and obtain an interactive instruction for the virtual scene and display an interactive effect corresponding to the interactive instruction on the terminal.

In an embodiment, there is also provided a computer readable storage medium on which a computer program is stored. The computer program, when executed by a processor, causes the processor to:

display, on a terminal, a real-time captured real-world scene image; wherein the real-world scene image includes a virtual model;

control a scene image displayed on the terminal to switch from a real-world scene to a virtual scene in response to detecting that a viewpoint of the terminal crosses a plane where the scene edge of the virtual model located, during the process that a scene edge of the virtual model extends towards the terminal; and obtain an interactive instruction for the virtual scene and display an interactive effect corresponding to the interactive instruction on the terminal.

The virtual reality interaction apparatus, the device and the storage medium provided in the above embodiments may perform the virtual reality interaction method provided in any embodiment of the present disclosure, and have corresponding functional modules for performing the method and beneficial effects. For technical details not described in detail in the foregoing embodiments, a reference may be made to the virtual reality interaction method provided in any embodiment of the present disclosure.

According to one or more embodiments of the present disclosure, there is provided a virtual reality interaction method, including:

displaying, on a terminal, a real-time captured real-world scene image; wherein the real-world scene image includes a virtual model;

controlling a scene image displayed on the terminal to switch from a real-world scene to a virtual scene in response to detecting that a viewpoint of the terminal crosses a plane where the scene edge of the virtual model located, during the process that a scene edge of the virtual model extends towards the terminal; and obtaining an interactive instruction for the virtual scene and displaying an interactive effect corresponding to the interactive instruction on the terminal.

According to one or more embodiments of the present disclosure, there is provided the virtual reality interaction method, further including: detecting rotational motion data of the terminal; and displaying, on the terminal, a virtual scene image corresponding to the rotational motion data in the virtual scene.

Optionally, the virtual scene image includes interactive guidance information therein.

According to one or more embodiments of the present disclosure, there is provided the virtual reality interaction method, further including: determining a first target object corresponding to the rotational motion data in the virtual scene; obtaining a depth information of the first target object; and rendering the first target object based on the depth information and displaying a rendering result on the terminal.

According to one or more embodiments of the present disclosure, there is provided the virtual reality interaction method, further including: displaying, on the terminal, a first interactive effect in response to a triggering operation for a first second target object in the virtual scene; and synchronously displaying the first interactive effect and a second interactive effect in response to a triggering operation for the N-th second target object in the virtual scene, wherein the first interactive effect is different from the second interactive effect, and N is a natural number greater than 1.

According to one or more embodiments of the present disclosure, there is provided the virtual reality interaction method, further including: obtaining the interactive instruction for the virtual scene; obtaining a current virtual scene image and a current interactive image corresponding to the interactive instruction, wherein the current virtual scene image is a mixed image, and the current interactive image is an image to be mixed; performing a mixing operation on the current interactive image using the current virtual scene image to obtain a target virtual scene image; and displaying the target virtual scene image.

According to one or more embodiments of the present disclosure, there is provided the virtual reality interaction method, further including: controlling the scene image displayed on the terminal to switch from the virtual scene to the real-world scene in response to detecting that the viewpoint of the terminal crosses the plane where the scene edge of the virtual model located again.

According to one or more embodiments of the present disclosure, there is provided the virtual reality interaction method, further including: when a distance between the viewpoint of the terminal and the plane where the scene edge of the virtual model located satisfies a preset threshold, performing a complementing operation on a current display image to pad an image clipped by a near clipping plane of the terminal.

According to one or more embodiments of the present disclosure, there is provided the virtual reality interaction method, further including: determining a target padding image based on a relative positional relationship between the viewpoint of the terminal and the plane where the scene edge of the virtual model located; and performing the complementing operation on the current display image using the target padding image.

According to one or more embodiments of the present disclosure, there is provided the virtual reality interaction method, further including: determining a first result of whether the viewpoint of the terminal crosses the plane where the scene edge of the virtual model located based on world coordinate positions of the scene edge of the virtual model in a previous frame and a current frame and a world coordinate position of the terminal in the current frame; determining a second result of whether the viewpoint of the terminal crosses the plane where the scene edge of the virtual model located based on world coordinate positions of the terminal in the previous frame and the current frame and a world coordinate position of the scene edge of the virtual model in the current frame; and determining a target result of whether the viewpoint of the terminal crosses the plane where the scene edge of the virtual model located based on at least one of the first result and the second result.

According to one or more embodiments of the present disclosure, there is provided the virtual reality interaction method, further including: extending the scene edge of the virtual model to completely cover the display image.

What is claimed is:

1. A virtual reality interaction method, comprising:
   displaying, on a terminal, a real-time captured real-world scene image; wherein the real-world scene image includes a virtual model;
   extending a scene edge of the virtual model towards a screen edge of the terminal;
   switching a scene image displayed on the terminal from the real-world scene to a virtual scene in response to detecting that a viewpoint of the terminal crosses a plane where the scene edge of the virtual model is located;
   obtaining an interactive instruction for the virtual scene and displaying an interactive effect corresponding to the interactive instruction; and
   in response to a distance between the viewpoint of the terminal and the plane where the scene edge of the virtual model is located satisfying a preset threshold, complementing a current display image to fill an area that has been cropped.

2. The method according to claim 1, wherein the obtaining an interactive instruction for the virtual scene and displaying an interactive effect corresponding to the interactive instruction comprises:
   detecting rotational motion data of the terminal; and
   displaying, on the terminal, a virtual scene image corresponding to the rotational motion data in the virtual scene.

3. The method according to claim 2, wherein the virtual scene image includes interactive guidance information.

4. The method according to claim 2, wherein the displaying, on the terminal, a virtual scene image corresponding to the rotational motion data in the virtual scene comprises:
   determining a first target object corresponding to the rotational motion data in the virtual scene;
   obtaining depth information of the first target object; and
   rendering the first target object based on the depth information and displaying a rendering result on the terminal.

5. The method according to claim 1, wherein the obtaining an interactive instruction for the virtual scene and displaying an interactive effect corresponding to the interactive instruction comprises:
   displaying, on the terminal, a first interactive effect in response to a triggering operation for a first object in second target objects in the virtual scene; and
   synchronously displaying the first interactive effect and a second interactive effect in response to a triggering operation for an N-th object in the second target objects in the virtual scene, wherein the first interactive effect is different from the second interactive effect, and N is a natural number greater than 1.

6. The method according to claim 1, wherein the obtaining an interactive instruction for the virtual scene and displaying an interactive effect corresponding to the interactive instruction comprises:
   obtaining the interactive instruction for the virtual scene;
   obtaining a current virtual scene image and a current interactive image corresponding to the interactive instruction, wherein the current virtual scene image is a mixed image, and the current interactive image is an image to be mixed;
   performing a mixing operation on the current interactive image using the current virtual scene image to obtain a target virtual scene image; and
   displaying the target virtual scene image.

7. The method according to claim 1, further comprising:
   switching the scene image displayed on the terminal from the virtual scene to the real-world scene in response to detecting that the viewpoint of the terminal crosses the plane where the scene edge of the virtual model is located again.

8. The method according to claim 1, wherein complementing a current display image comprises:
   determining a target padding image based on a relative positional relationship between the viewpoint of the terminal and the plane where the scene edge of the virtual model is located; and
   complementing the current display image using the target padding image.

9. The method according to claim 1, wherein the detecting the viewpoint of the terminal crosses the plane where the scene edge of the virtual model is located comprises:
   determining a first result of whether the viewpoint of the terminal crosses the plane where the scene edge of the virtual model is located, based on world coordinate positions of the scene edge of the virtual model in a previous frame and a current frame and a world coordinate position of the terminal in the current frame;
   determining a second result of whether the viewpoint of the terminal crosses the plane where the scene edge of the virtual model is located based on world coordinate positions of the terminal in the previous frame and the current frame and a world coordinate position of the scene edge of the virtual model in the current frame; and
   determining a target result of whether the viewpoint of the terminal crosses the plane where the scene edge of the virtual model is located based on at least one of the first result and the second result.

10. The method according to claim 1, wherein the detecting that the viewpoint of the terminal crosses the plane where the scene edge of the virtual model is located comprises:
    extending the scene edge of the virtual model to completely cover the display image.

11. An electronic device, comprising a memory and a processor, wherein the memory stores a computer program, wherein the computer program, when executed by the processor, cause the processor to:
    display, on a terminal, a real-time captured real-world scene image; wherein the real-world scene image includes a virtual model;
    extend a scene edge of the virtual model towards a screen edge of the terminal;
    switch a scene image displayed on the terminal from the real-world scene to a virtual scene in response to detecting that a viewpoint of the terminal crosses a plane where the scene edge of the virtual model is located;
    obtain an interactive instruction for the virtual scene and displaying an interactive effect corresponding to the interactive instruction; and
    in response to a distance between the viewpoint of the terminal and the plane where the scene edge of the virtual model is located satisfying a preset threshold, complement a current display image to fill an area that has been cropped.

12. The device according to claim 11, wherein the processor is further caused to:
detect rotational motion data of the terminal; and
display, on the terminal, a virtual scene image corresponding to the rotational motion data in the virtual scene.

13. The device according to claim 12, wherein the processor is further caused to:
determine a first target object corresponding to the rotational motion data in the virtual scene;
obtain depth information of the first target object; and
render the first target object based on the depth information and displaying a rendering result on the terminal.

14. The device according to claim 11, wherein the processor is further caused to:
display, on the terminal, a first interactive effect in response to a triggering operation for a first object in second target objects in the virtual scene; and
synchronously display the first interactive effect and a second interactive effect in response to a triggering operation for an N-th object in the second target objects in the virtual scene, wherein the first interactive effect is different from the second interactive effect, and N is a natural number greater than 1.

15. The device according to claim 11, wherein the processor is further caused to:
obtain the interactive instruction for the virtual scene;
obtain a current virtual scene image and a current interactive image corresponding to the interactive instruction, wherein the current virtual scene image is a mixed image, and the current interactive image is an image to be mixed;
perform a mixing operation on the current interactive image using the current virtual scene image to obtain a target virtual scene image; and
display the target virtual scene image.

16. The device according to claim 11, wherein the processor is further caused to:
switch the scene image displayed on the terminal from the virtual scene to the real-world scene in response to detecting that the viewpoint of the terminal crosses the plane where the scene edge of the virtual model is located again.

17. The device according to claim 11, wherein the processor is further caused to:
determine a first result of whether the viewpoint of the terminal crosses the plane where the scene edge of the virtual model is located, based on world coordinate positions of the scene edge of the virtual model in a previous frame and a current frame and a world coordinate position of the terminal in the current frame;
determine a second result of whether the viewpoint of the terminal crosses the plane where the scene edge of the virtual model is located based on world coordinate positions of the terminal in the previous frame and the current frame and a world coordinate position of the scene edge of the virtual model in the current frame; and
determine a target result of whether the viewpoint of the terminal crosses the plane where the scene edge of the virtual model is located based on at least one of the first result and the second result.

18. The device according to claim 11, wherein the processor is further caused to:
extend the scene edge of the virtual model to completely cover the display image.

19. A non-transitory computer readable storage medium storing instructions that cause at least a processor to:
display, on a terminal, a real-time captured real-world scene image; wherein the real-world scene image includes a virtual model;
extend a scene edge of the virtual model towards a screen edge of the terminal;
switch a scene image displayed on the terminal from the real-world scene to a virtual scene in response to detecting that a viewpoint of the terminal crosses a plane where the scene edge of the virtual model is located;
obtain an interactive instruction for the virtual scene and displaying an interactive effect corresponding to the interactive instruction; and
in response to a distance between the viewpoint of the terminal and the plane where the scene edge of the virtual model is located satisfying a preset threshold, complement a current display image to fill an area that has been cropped.

20. The non-transitory computer readable storage medium according to claim 19, wherein the at least a processor is further caused to:
detect rotational motion data of the terminal; and
display, on the terminal, a virtual scene image corresponding to the rotational motion data in the virtual scene.

* * * * *